(12) United States Patent
Roberts

(10) Patent No.: US 9,136,680 B2
(45) Date of Patent: Sep. 15, 2015

(54) PROTECTIVE FITTING

(76) Inventor: Mikeal Roberts, Wayne, OK (US)

( * ) Notice: Subject to any disclaimer, the term of this patent is extended or adjusted under 35 U.S.C. 154(b) by 65 days.

(21) Appl. No.: 12/843,256

(22) Filed: Jul. 26, 2010

(65) Prior Publication Data

US 2012/0018997 A1    Jan. 26, 2012

(51) Int. Cl.
*F16L 35/00* (2006.01)
*H02G 3/06* (2006.01)

(52) U.S. Cl.
CPC ............................. *H02G 3/0691* (2013.01)

(58) Field of Classification Search
USPC .......... 285/149.1, 150.1, 151.1, 154.1, 293.1, 285/901, 903, 148.18, 148.23, 36, 40, 393, 285/392
See application file for complete search history.

(56) References Cited

U.S. PATENT DOCUMENTS

| | | | | |
|---|---|---|---|---|
| 868,914 | A * | 10/1907 | Dawson | 215/356 |
| 1,800,348 | A | 4/1931 | Hunter | |
| 2,378,901 | A * | 6/1945 | Amrhein et al. | 242/118.32 |
| 2,556,627 | A * | 6/1951 | Miksis | 285/390 |
| 2,776,151 | A * | 1/1957 | Harkenrider | 285/148.13 |
| 3,264,013 | A * | 8/1966 | Alberghini et al. | 285/22 |
| 3,321,219 | A | 5/1967 | Sebo | |
| 3,322,890 | A * | 5/1967 | Kennedy et al. | 174/152 R |
| 4,140,869 | A | 2/1979 | Carter | |
| 4,186,931 | A * | 2/1980 | Anderson | 277/603 |
| 4,192,532 | A | 3/1980 | Pacella | |
| 4,241,878 | A * | 12/1980 | Underwood | 239/591 |
| 4,302,035 | A * | 11/1981 | Ochwat | 285/149.1 |
| 4,342,337 | A * | 8/1982 | Underwood | 138/96 T |
| 4,394,025 | A * | 7/1983 | Anderson | 277/617 |
| 4,440,425 | A * | 4/1984 | Pate et al. | 285/149.1 |
| 4,457,544 | A | 7/1984 | Snow | |
| 4,544,800 | A * | 10/1985 | Katsuura | 174/653 |
| 4,562,602 | A * | 1/1986 | Cuschera | 285/136.1 |
| 4,679,827 | A * | 7/1987 | Law | 285/151.1 |
| 4,817,991 | A * | 4/1989 | Frentzel et al. | 285/7 |
| 4,893,846 | A * | 1/1990 | McGraw | 285/133.4 |
| 4,991,629 | A * | 2/1991 | Ernesto et al. | 138/89 |
| 5,306,187 | A * | 4/1994 | Mackal | 441/41 |
| 5,503,187 | A * | 4/1996 | Simmons et al. | 138/89 |
| 5,570,909 | A | 11/1996 | Reynolds, Jr. | |
| 5,775,375 | A * | 7/1998 | Calhoun | 138/89 |
| 5,866,853 | A * | 2/1999 | Sheehan | 174/653 |
| 5,915,736 | A * | 6/1999 | Marik et al. | 285/21.3 |
| 6,006,961 | A * | 12/1999 | Wark | 285/148.23 |
| 6,123,364 | A * | 9/2000 | Inoue et al. | 285/40 |
| 6,183,021 | B1 * | 2/2001 | Walsh et al. | 285/123.15 |
| 6,409,220 | B1 * | 6/2002 | Wing et al. | 285/12 |
| 7,048,561 | B1 * | 5/2006 | Elbaz | 439/271 |
| 7,658,418 | B1 * | 2/2010 | Elbaz et al. | 285/153.1 |
| 7,677,603 | B2 * | 3/2010 | Happel | 285/139.2 |
| 2002/0033601 | A1 * | 3/2002 | Mullen, Jr. | 285/149.1 |
| 2010/0244432 | A1 * | 9/2010 | Neame et al. | 285/21.2 |

* cited by examiner

*Primary Examiner* — Aaron Dunwoody
(74) *Attorney, Agent, or Firm* — John M. Behles

(57) ABSTRACT

Protective fittings for tubular conduit are provided herein. An exemplary protective fitting includes a substantially tubular body sized such that an outer peripheral surface of the tubular body is configured to frictionally contact at least a portion of the threaded inner surface of the tubular conduit to releaseably secure the substantially tubular body to the terminal end of the tubular conduit when the substantially tubular body is inserted therein, and a flange extending from the outer peripheral surface of the terminal end of the substantially tubular body. The protective fitting prevents wiring extending from the terminal end of the tubular conduit from contacting the peripheral edge of the terminal end of the tubular conduit.

9 Claims, 4 Drawing Sheets

PROTECTIVE FITTING

CROSS-REFERENCE TO RELATED APPLICATION(S)

Not applicable

BACKGROUND OF THE INVENTION

1. Field of the Invention

The present invention relates in general to protective fittings and, more particularly, but not by way of limitation, to protective fittings for covering the terminal end of a conduit to prevent damage to wiring extending therefrom, wherein the protective fittings can be releaseably threaded onto the end of the terminal end of the conduit.

2. Background Art

Protective fittings and/or coupling have been known in the art for years, and are the subject of numerous patents, including: U.S. Pat. No. 1,800,348 entitled "Conduit Sleeve," U.S. Pat. No. 3,156,491 entitled "End Fittings for Flexible Hoses, Conduits, or the Like," U.S. Pat. No. 3,321,219 entitled "Flexible Conduit Connector," U.S. Pat. No. 4,140,869 entitled "Constant Grip Flexible Connector for Flexible Electrical Conduit," U.S. Pat. No. 4,192,532 entitled "Flexible Conduit Connector," U.S. Pat. No. 4,457,544 entitled "Connector for Flexible Electrical Conduit," and U.S. Pat. No. 5,570,909 entitled "Conduit Connection"—all of which are hereby incorporated herein by reference in their entirety including the references cited therein.

U.S. Pat. No. 1,800,348 appears to disclose connectors adapted to connect flexible metallic conduits to outlet boxes and the like. The general object of the invention is the provision of a new and improved connector embodying means to rigidly grip a conduit and to protect the electric wires extending through said conduit into the box or other element to which the connector is secured.

U.S. Pat. No. 3,156,491 appears to disclose end fittings for flexible hoses, conduits or the like and particularly electrical conduits intended to enclose a number of individual electrical conductors which are bunched together and usually soldered to a multi-pin plug or other type of electrical connector.

U.S. Pat. No. 3,321,219 appears to disclose electrical cable connections and more particularly to a connector for securing a flexible conduit to a terminal box.

U.S. Pat. No. 4,140,869 appears to disclose a constant grip flexible connector apparatus for flexible electrical conduit which comprises a coupling portion to provide a threaded engagement with the electrical conduit and a positive connection for electrical connection between the conduit and the connector and a threaded coupling for connection to a junction box.

U.S. Pat. No. 4,192,532 appears to disclose a coupling assembly including a double-female connector for connecting two sections of flexible electrical conduit. An internal abutment between the ends of the connector limits the insertion of the conduit sections. The inner surfaces of the connector on both sides of the abutment are tapered to constrict the inserted conduit sections. The connector has external threading on both ends and external flats between the threading to which a wrench may be applied.

U.S. Pat. No. 4,457,544 appears to disclose a connector for a liquid tight, flexible electrical conduit formed of a plurality of interlocking, thin, arcuate metal ring sections having an interior wall of alternating ridges and grooves. The connector includes a ferrule end insertable into the conduit with a plurality of spatially separated arcuate segments matching the conduit grooves for threadable engagement. A resilient seat member snug fit onto the ferrule is engaged by the conduit end as the conduit is threaded onto the ferrule to sealingly terminate the full perimeter edge of the conduit end, thereby enabling the conduit and connector assembly to be air and liquid tight. One or more ramp formed barbs are provided on one or more of the ferrule arcuate segments to lock and secure the connector on the conduit and prevent undesired loosening.

U.S. Pat. No. 5,570,909 appears to disclose a connector for a rigid electrical conduit which has an internal cylindrical socket sized to snugly receive the end of the conduit. A spring leaf detent is externally mounted on the connector body, with a free end of the leaf extending through a slot in the connector body side wall. Inserting a conduit into the socket deflects the spring leaf away from the socket axis, thereby generating a resilient stress in the leaf that enables the free end of the leaf to exert a gripping action on the conduit. The grip action can be removed by unloosening a screw that is used to mount the leaf spring on the connector body.

While the above-identified patents do appear to provide protective fittings and/or coupling for conduit, their configurations remain non-desirous and/or problematic inasmuch as, among other things, none of the above-identified apparatuses appear to disclose a protective fitting for association with the terminal end of a conduit to prevent wiring extending therefrom from contacting a peripheral edge of the terminal end of the conduit—among other things.

It is therefore an object of the present invention to provide a protective fitting, which, among other things, remedies the aforementioned detriments and/or complications associated with the use of the above-identified, conventional protective fittings and/or couplings.

These and other objects of the present invention will become apparent in light of the present specification, claims, and drawings.

SUMMARY OF THE INVENTION

In one embodiment, the present invention is directed to a protective fitting for tubular conduit, the tubular conduit having substantially threaded inner and outer surfaces and a terminal end defining a peripheral edge, the tubular conduit having at least one wire extending therethrough and at least partially from the terminal end of the tubular conduit, the protective fitting comprising: (a) a substantially tubular body sized such that an outer peripheral surface of the tubular body is configured to frictionally contact at least a portion of the threaded inner surface of the tubular conduit to releaseably secure the substantially tubular body to the terminal end of the tubular conduit when the substantially tubular body is slidably inserted therein; (b) a flange extending from the outer peripheral surface of the terminal end of the substantially tubular body; and (c) wherein when the protective fitting is slidably inserted with the terminal end of the tubular conduit, the flange covers the peripheral edge of the terminal end of the tubular conduit to prevent damage to the at least one wire extending from the tubular conduit.

In another embodiment, an intersection point formed between the inner surface of the tubular body and an outer surface of the flange is rounded.

In an additional embodiment, an intersection point formed between the inner surface of the tubular body and an outer surface of the flange is chamfered.

In yet another embodiment, the outer peripheral surface of the tubular body includes at least one protrusion extending outwardly therefrom.

In one embodiment, the present invention is directed to a protective fitting for tubular conduit, the tubular conduit having substantially threaded inner and outer surfaces and a terminal end defining a peripheral edge, the tubular conduit having at least one wire extending therethrough and at least partially from the terminal end of the tubular conduit, the protective fitting comprising: (a) a substantially tubular body having an at least partially threaded outer surface configured to matingly cooperate with at least one of the threaded inner and outer surfaces of the tubular conduit to releaseably secure the substantially tubular body to the terminal end of the tubular conduit when the substantially tubular body is threadably engaged therewith; (b) a flange extending from the outer surface of the terminal end of the substantially tubular body; (c) wherein when the protective fitting is threadably engaged with the terminal end of the tubular conduit, the flange covers the peripheral edge of the terminal end of the tubular conduit to prevent damage to the at least one wire extending from the tubular conduit; and (d) wherein the protective fitting is at least partially fabricated from a polymeric material.

In yet another embodiment, the present invention is directed to a protective fitting for tubular conduit, the tubular conduit having a substantially threaded inner surface and a terminal end defining a peripheral edge, the tubular conduit having at least one wire extending therethrough and at least partially from the terminal end of the tubular conduit, the protective fitting comprising: (a) a substantially tubular body having an at least partially threaded outer surface configured to matingly cooperate with the threaded inner surface of the tubular conduit to releaseably secure the substantially tubular body to the terminal end of the tubular conduit when the substantially tubular body is threadably inserted therein; (b) a flange extending outwardly from the outer surface of the terminal end of the substantially tubular body; (c) wherein when the protective fitting is threadably inserted into the terminal end of the tubular conduit, the flange covers the peripheral edge of the terminal end of the tubular conduit to prevent damage to the at least one wire extending from the tubular conduit; and (d) wherein the protective fitting is at least partially fabricated from a polymeric material.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
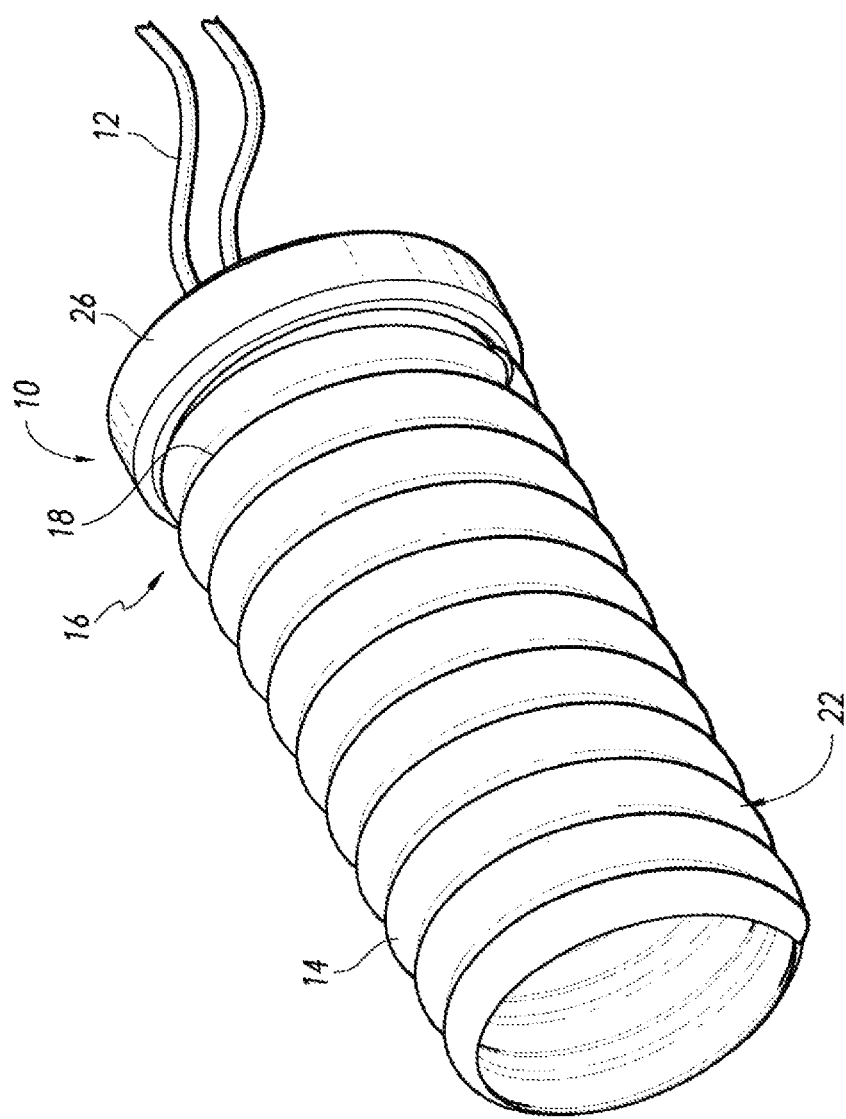
FIG. 1 of the drawings is a perspective of a protective fitting inserted within a flexible conduit.
Figure 2:
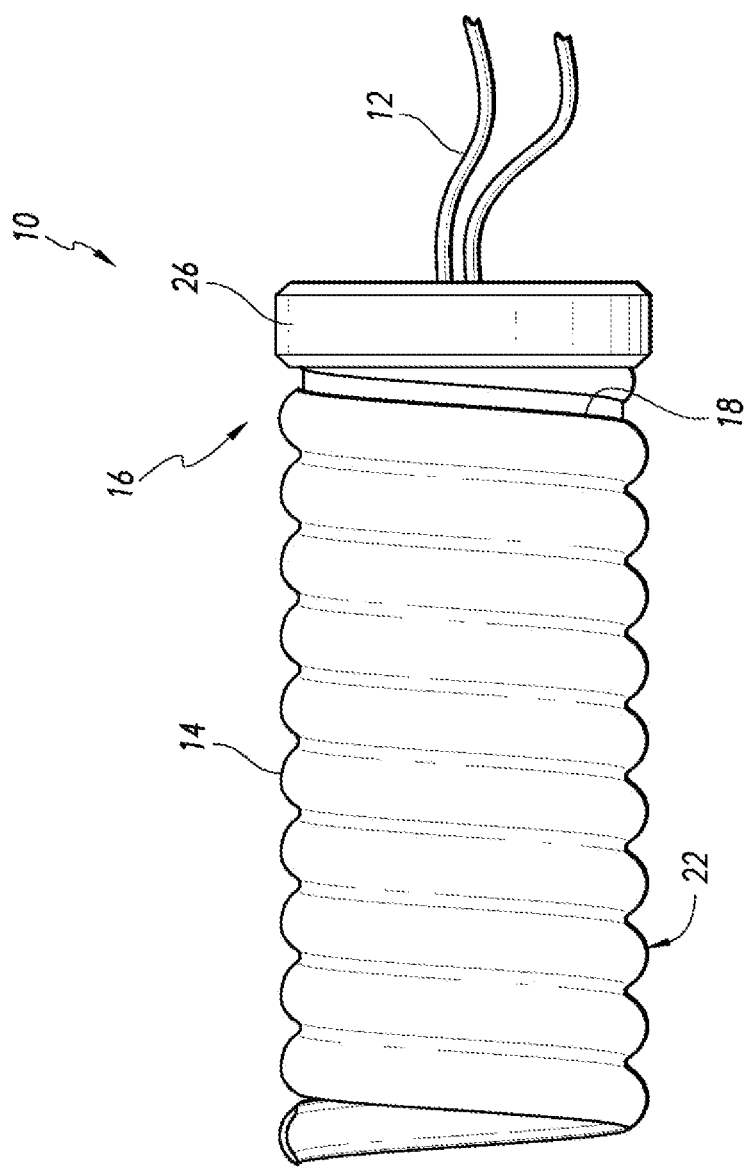
FIG. 2 of the drawings is a side elevation view of FIG. 1.
Figure 3:
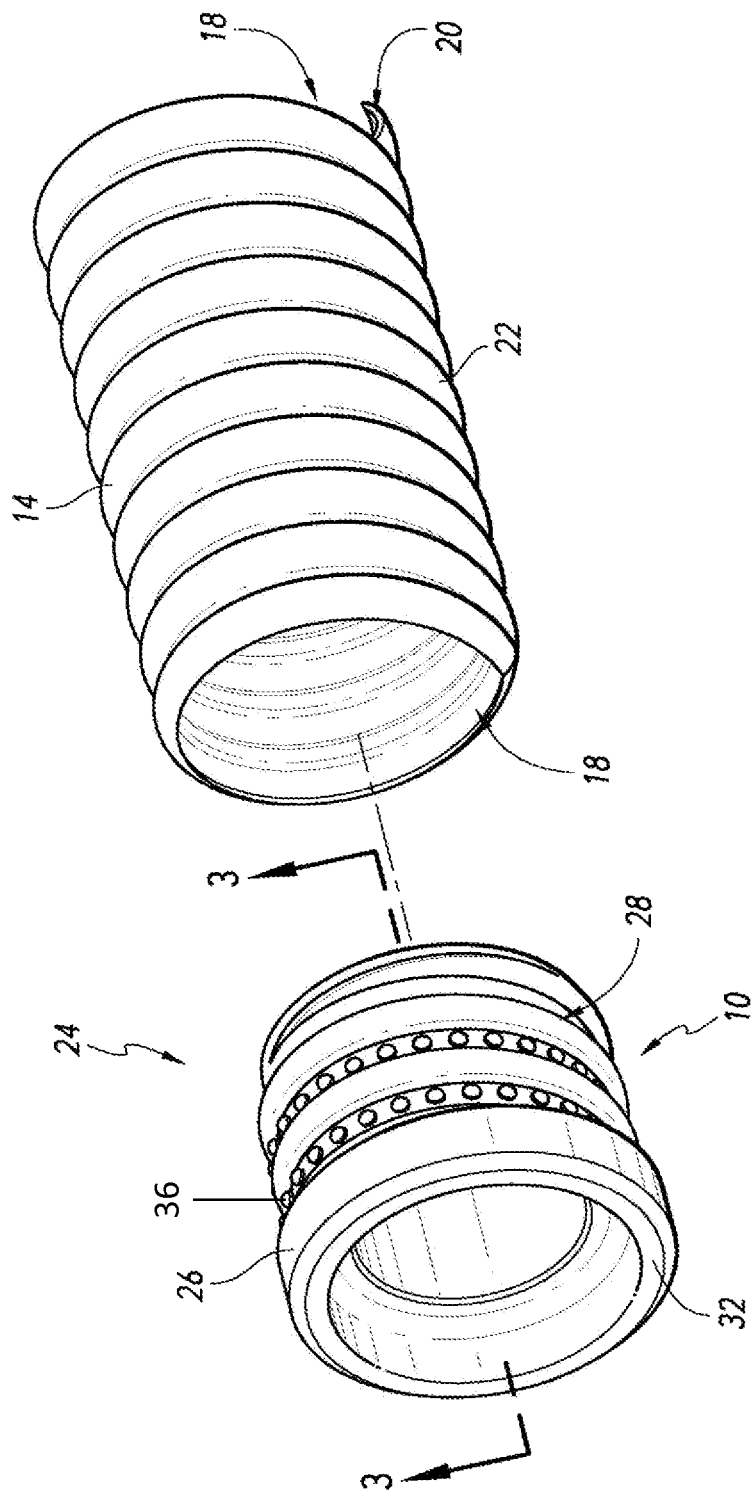
FIG. 3 of the drawings is an exploded view of a protective fitting and a flexible conduit.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the collective drawings (i.e., FIGS. 1-5), shown therein is a protective fitting for conduit, hereinafter referred to as fitting 10. In one embodiment, fitting 10 protects wiring 12 extending from a terminal end of conduit 14. Generally speaking, the fitting 10 may be utilized in conjunction with low voltage conduit carrying items such as data cable and coaxial cable.

Typically, conduit 14 is fabricated from a metal or other rigid material, and in one particular embodiment conduit 14 includes flexible conduit that is fabricated from a helically wrapped, loosely interlocked strip that forms threaded inner and outer surfaces 20 and 22 (FIG. 3), respectively. Generally, conduit 14 is provided in long stock portions that can be trimmed to the proper length during installation. Trimming of conduit 14 produces terminal end 16 that has peripheral edge 18 that can cut or otherwise damage wiring 12 extending from terminal end 16.

In one embodiment, fitting 10 is a single bodied tubular member that includes tubular body 24 having flange 26. It will be understood that fitting 10 is preferably constructed from a polymeric material, although other types of materials such as resins, natural products such as wood, composites, and the like, which would be known to one of ordinary skill in the art with the present disclosure before them are also likewise contemplated for use in accordance with the present invention.

Tubular body 24 includes outer peripheral surface 28 having at least one helical, screw-type thread 30 that extends along the length thereof. It will be understood that thread 30 should be configured (thread-form, thread, angle, pitch, major and minor diameters, and the like) to cooperate with threaded inner surface 20 of conduit 14 such that tubular body 24 can be threadably inserted within terminal end 16 of conduit 14. In one embodiment, the thread 30 includes two sidewalls 31 extending normally from tubular body 24 and in spaced apart relationship to one another and a convex 33 portion extending between the sidewalls 31. It will be understood that because the sidewalls 31 extend normally from the tubular body 24, the protective fitting 10 may be releaseably threaded onto the conduit 14. More specifically, the protective fitting 10 can be fully threaded into the conduit 14 and unthreaded from the conduit 14 such that if the protective fitting 10 is accidentally installed improperly, the protective fitting may be removed and reinserted.

Flange 26 extends outwardly and normally from the end of tubular body 24 opposite the end that is configured to be slidably inserted within terminal end 16 of conduit 14. Flange 26 prevents wiring 12 from contacting peripheral edge 18 of terminal end 16 of conduit 14 and may also function as a stop to prevent inserting fitting to far within conduit 14 which can result in potential contact between wiring 12 and peripheral edge 18 of conduit 14.

To further protect wiring 12 from damage, intersection point 32 formed by the transition of the inner surface tubular body 24 and outer surface 22 of flange 26 may be rounded, chamfered, beveled, or otherwise modified.

Additionally, fitting 10 may optionally include one or more protrusions 36 that extend from outer peripheral surface 28 of tubular body 24. As fitting 10 is threadably inserted within terminal end 16 of conduit 14, protrusions 36 contact inner surface 20 of conduit 14 and act as frictional engagement points to aid in securement of fitting 10 to terminal end 16.

Figure 5:
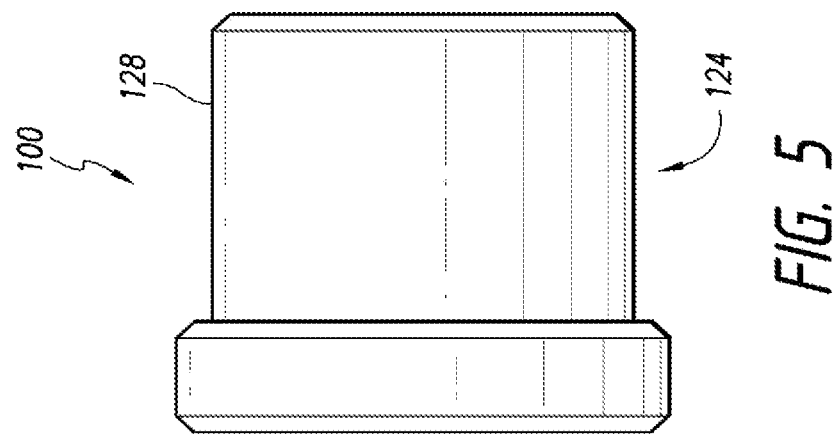
FIG. 5 of the drawings is a side elevation view of an alternative protective fitting.
Figure 4:
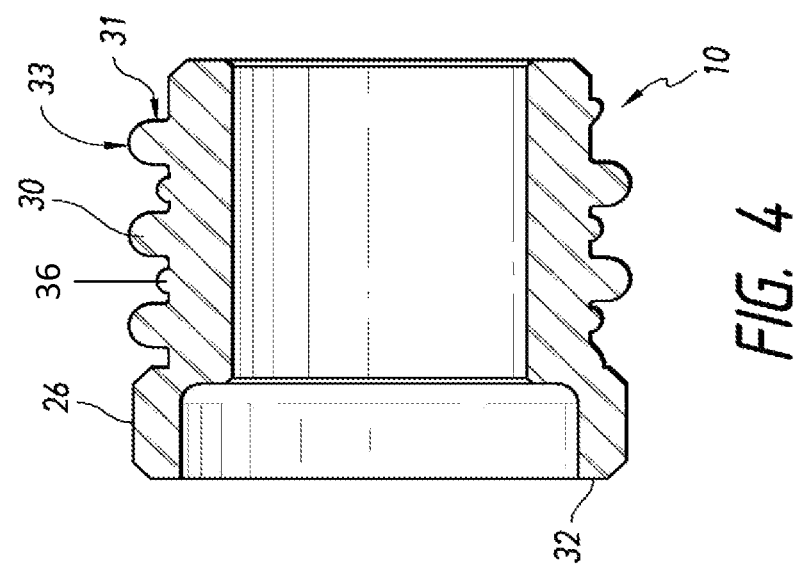
FIG. 4 of the drawings is a cross-sectional view of a protective fitting.

Referring now to FIG. 5, shown therein is an alternative embodiment of fitting 100. Fitting 100 is constructed substantially similarly to fitting 10 with the exception that outer peripheral surface 128 of tubular body 124 is substantially uniform in diameter along the length thereof rather than having helical threading. Tubular body 124 is sized such that when tubular body 124 is inserted within terminal end 16 of conduit 14, outer peripheral surface 128 frictionally engages the apexes of helical threading of conduit 14 to releaseably secure fitting 100 to terminal end 16 of conduit 14.

It will be understood that although fittings have been disclosed as being adapted to frictionally or threadably engage the terminal end of the conduit, one of ordinary skill in the art will appreciate that the fittings may be adapted to frictionally or threadably engage outer surface of the conduit. As such, the flange of the fitting may be configured to extend inwardly rather than outwardly from an end of the tubular body.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A protective fitting for low voltage electrical conduit, the low voltage electrical conduit having a substantially threaded inner surface and a terminal end defining a peripheral edge, the protective fitting comprising:
    a substantially tubular body sized such that an outer peripheral surface of the tubular body is configured to frictionally contact at least a portion of the threaded inner surface of the low voltage electrical conduit to releaseably secure the substantially tubular body to the terminal end of the low voltage electrical conduit when the substantially tubular body is inserted therein, the tubular body having open opposing terminal ends, the outer peripheral surface comprising a threaded outer surface having a thread pattern consisting of two sidewalls extending normally from the tubular body and in spaced apart relationship to one another and a convex portion extending between the sidewalls such that the tubular body is configured to mate with a helically wrapped, loosely interlocked strip forming the low voltage electrical conduit;
    a plurality of protrusions disposed between the two sidewalls of the thread pattern, the plurality of protrusions extending in a helical pattern around the outer peripheral surface;
    a flange extending from the outer peripheral surface of at least one of the terminal ends of the substantially tubular body; and
    wherein when the protective fitting is inserted with the terminal end of the low voltage electrical conduit, the protective fitting is capable of preventing wiring extending from the at least one of the terminal ends having the flange from contacting the peripheral edge of the terminal end of the low voltage electrical conduit.

2. The protective fitting of claim 1, wherein an intersection point formed between an inner surface of the tubular body and an outer surface of the flange is rounded.

3. The protective fitting of claim 1, wherein an intersection point formed between an inner surface of the tubular body and an outer surface of the flange is chamfered.

4. A protective fitting for tubular conduit, the tubular conduit having substantially threaded inner and outer surfaces and a terminal end defining a peripheral edge, the tubular conduit having at least one wire extending therethrough and at least partially from the terminal end of the tubular conduit, the protective fitting consisting of:
    a substantially tubular body having a threaded inner and outer surface configured to matingly cooperate with at least one of the threaded inner and outer surfaces of the tubular conduit to releaseably secure the substantially tubular body to the terminal end of the tubular conduit when the substantially tubular body is threadably engaged therewith, the tubular body having open opposing terminal ends, the substantially tubular body further comprising a plurality of protrusions being disposed extending in a helical pattern around the outer peripheral surface, wherein each of the plurality of protrusions is a circular dome extending outwardly from the outer peripheral surface;
    a flange extending from the outer surface of at least one of the terminal ends of the substantially tubular body;
    wherein when the protective fitting is threadably engaged with the terminal end of the tubular conduit, the flange covers the peripheral edge of the terminal end of the tubular conduit, and the flange is capable of preventing the at least one wire extending from contacting the peripheral edge of the tubular conduit; and
    wherein the protective fitting is fabricated from a polymeric material.

5. The protective fitting of claim 4, wherein an intersection point formed between the inner surface of the tubular body and an outer surface of the flange is rounded.

6. The protective fitting of claim 4, wherein an intersection point formed between the inner surface of the tubular body and an outer surface of the flange is chamfered.

7. A protective tubular insert for low voltage electrical conduit, the low voltage electrical conduit consisting of a threaded inner surface and a terminal end defining a peripheral edge, the low voltage electrical conduit configured to allow at least one wire to extend therethrough and at least partially from the terminal end of the low voltage electrical conduit, the protective tubular insert having an at least partially threaded outer surface configured to matingly cooperate with the threaded inner surface of the low voltage electrical conduit to releaseably secure the substantially tubular body to the terminal end of the low voltage electrical conduit when the substantially tubular body is threadably inserted therein and a flange extending outwardly from the outer surface of the terminal end of the substantially tubular body; wherein when the protective fitting is threadably inserted into the terminal end of the low voltage electrical conduit, the flange covers the peripheral edge of the terminal end of the low voltage electrical conduit; and wherein the protective fitting is fabricated from a polymeric material, wherein the at least partially threaded outer surface includes a thread having two sidewalls extending normally from tubular body and in spaced apart relationship to one another and a convex portion extending between the sidewalls.

8. The protective fitting of claim 7, wherein an intersection point formed between an inner surface of the tubular body and an outer surface of the flange is rounded.

9. The protective fitting of claim 7, wherein an intersection point formed between an inner surface of the tubular body and an outer surface of the flange is chamfered.

* * * * *